Dec. 7, 1971     G. R. SHOEMAKE     3,624,986

FLOW CONTROLLER FOR CARRIER GAS CHROMATOGRAPHY

Filed Sept. 4, 1970

*INVENTOR.*
GERALD R. SHOEMAKE

BY *Lindenberg, Freilich & Wasserman*

ATTORNEYS

United States Patent Office 3,624,986
Patented Dec. 7, 1971

3,624,986
FLOW CONTROLLER FOR CARRIER GAS
CHROMATOGRAPHY
Gerald R. Shoemake, La Canada, Calif., assignor to
California Institute of Technology, Pasadena, Calif.
Filed Sept. 4, 1970, Ser. No. 69,676
Int. Cl. B01d *15/08*
U.S. Cl. 55—197     15 Claims

ABSTRACT OF THE DISCLOSURE

A flow controller for a gas chromatograph includes a hydrogen permeable, palladium containing film interposed between a source of hydrogen carrier gas and the inlet to the chromatograph column. The hydrogen permeability of the film is dependent on its temperature. A variable electrical power supply connected to the film is energized in a programmed manner to heat the film to a selected temperature to control the flow rate of gas through the column.

ORIGIN OF THE INVENTION

The invention described herein was made in the performance of work under a NASA contract and is subject to the provisions of Sec. 305 of the National Aeronautics and Space Act of 1958, Public Law 85–568 (72 Stat. 435; 42 USC 2457).

BACKGROUND OF THE INVENTION (1) Field of the invention

The present invention relates to gas chromatograph and, more particularly, to an improved flow-controlled gas chromatographic system.

(2) Description of the prior art

Recently gas chromatographs have utilized the flow programming of the carrier gas to modulate the band separation of various constituents of the sample. Flow programming, as presently practiced, requires elaborate mechanical or electrically actuated valving arrangements under control of the programming device. Temperature program is also used to modify the effluent from a gas chromatograph. Temperature programming changes the carrier gas flow rate by effecting gas viscosity. However, quite often this results in anomalous detector responses, especially with flow sensitive detectors. Anomalous detector responses may also originate with contaminants in the carrier gas supply unless an extremely pure source of carrier gas is utilized.

SUMMARY OF THE INVENTION

An extremely simple, relatively inexpensive and very responsive controller/programmer has been devised according to the invention which automatically purifies the carrier gas as it meters the flow of gas into the column. The flow controller/programmer includes a film of material that is selectively permeable to carrier gas and the permeability to carrier gas increases in a controlled manner with temperature. Programming/controller means are utilized to control the temperature of the film to provide the desired flow rate.

In one embodiment, the programmer provides a predetermined increase in temperature of the film with time to provide an increased head pressure and increasing flow rate of the carrier gas through the column which enhances the migration of components through the column. In another embodiment, the programmer/controller is utilized to maintain a constant flow rate through the column by means of a feedback signal provided by a flow sensor disposed at the effluent to the column, or in an appropriate case, from a flow sensitive detector. In a further embodiment of the invention, the output from the detector is delivered to a carrier gas separator-generator and the carrier gas can be recycled to the carrier gas supply to the column.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
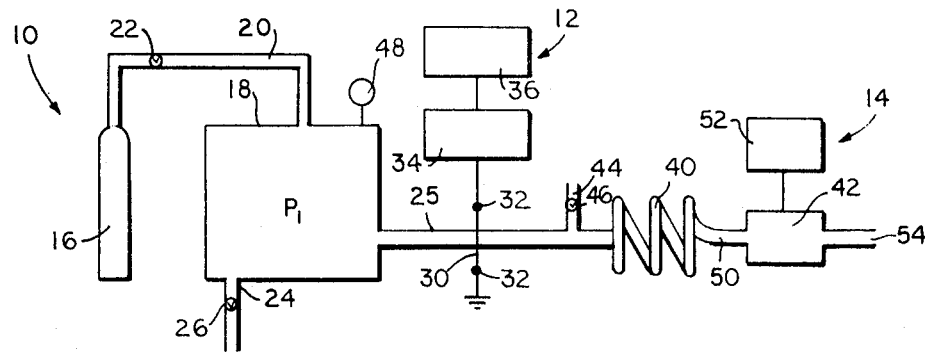
FIG. 1 is a schematic view of a first embodiment of the invention illustrating a pressure-time program controlled system.

Referring now to FIG. 1, a first embodiment of a flow controlled gas chromatograph in accordance with the invention generally includes a source of carrier gas 10, a flow programmer/controller 12 and a gas chromatograph 14. The carrier gas supply system includes a cylinder 16 of substantially pure carrier gas at high pressure which is connected to a pressurizing container 18 by means of a tube 20 containing a pressure regulating valve 22. The container 18 contains a carrier gas outlet tube 25 and a vent pipe 24 which includes an exhaust valve 26 for purging the system after build up of impurities within the container 18.

A palladium containing film 30 is interposed in outlet tube 25 across the complete perimeter thereof. The film 30 is selectively permeable to hydrogen when heated and the flux rate through the film is dependent on temperature and pressure. The pressure $P_1$ on the upstream side of film 30 is maintained constant by means of the regulating valve 22. The diffusion of hydrogen through palladium occurs at temperatures exceeding 100° C. up to a maximum flux rate experienced at about 500° C., though it is preferred to operate the film at temperatures of about 150° C. to about 250° C.–300° C.

Pure palladium metal when subjected to temperatures cycling in the presence of hydrogen may suffer mechanical distortion. It is preferred to use alloys of palladium containing a minor amount of silver, suitably about 15 to 30% silver. A 75% palladium-25% silver alloy is at least as permeable to hydrogen as pure palladium, but is mechanically stable. Other alloys of palladium and a noble metal, such as palladium-gold and palladium-rhodium may also be utilized as the hydrogen permeable barrier in the programmer/controller of the invention.

The film may be heated to hydrogen permeable temperature by various means. Indirect or direct heating by conduction, convection, or radiation may be utilized. However, the palladium film is found to have sufficient internal resistance on passage of electric current through the film to bring the film to desired temperature and to provide a direct linear control of temperature by varying the DC potential applied across the film. In a preferred form of the invention, the film 30 is heated by connecting the film to the terminals 32 of a variable DC power supply 34. A very simple and effective pressure flow program can then be affected by means of a time controller 36 which increases the voltage output of supply as a function of time and this will in turn provide an increasing flow rate of carrier gas to the gas chromatograph 14.

The gas chromatograph 14 comprises a column section 40 and a detector section 42. The column 40 is typically in the form of a spirally wound tube which is internally coated with a gas adsorbent such as silicone polymer. The chromatograph detector 42 is typically an ionization or thermal conductivity type of detector. The sample is introduced into the column through a sample inlet branch tube 44 containing a valve 46.

In a flow programmed chromatograph analysis utilizing the system of the invention, the regulating valve 22 is opened and turned to a setting to provide a pressure $P_1$ within the container 18. When the equilibrium pressure $P_1$ is reached as indicated on gauge 48, controller 36 is turned on to energize power supply 34 which in turn heats film 30 to a hydrogen permeable temperature. Sample inlet valve 46 is opened and the hydrogen carrier gas flowing through outlet tube 26 sweeps past the inlet branch 44 and carries the sample into the column 40. The components of the sample are segregated into bands as the sample is carried through the column. The bands emerge from the outlet 50 of the column and enter the detector 42. The response signal from the detector is indicated on recording device 52, such as a strip chart recorder. Effluent from the detector 42 may be vented through outlet tube 54.

As the run proceeds, the controller 36 gradually and continuously increases the output voltage from power supply 34 which increases the temperature of the film 30. As the permeability of film 30 increases with temperature, the hydrogen carrier gas flow rate is correspondingly increased. This has a tendency to speed the flow of the components of the sample through the column and to increase the resolution of the components into bands. Furthermore, the palladium film 30 is selectively permeable to hydrogen and any impurities in the hydrogen supply collect within the container 18. After several runs, the amount of impurities collecting in container 18 may affect the partial pressure of hydrogen within the container 18. Therefore, at this time, the exhaust valve 26 is opened and the contents of the container 18 are purged through tube 24.

Figure 2:
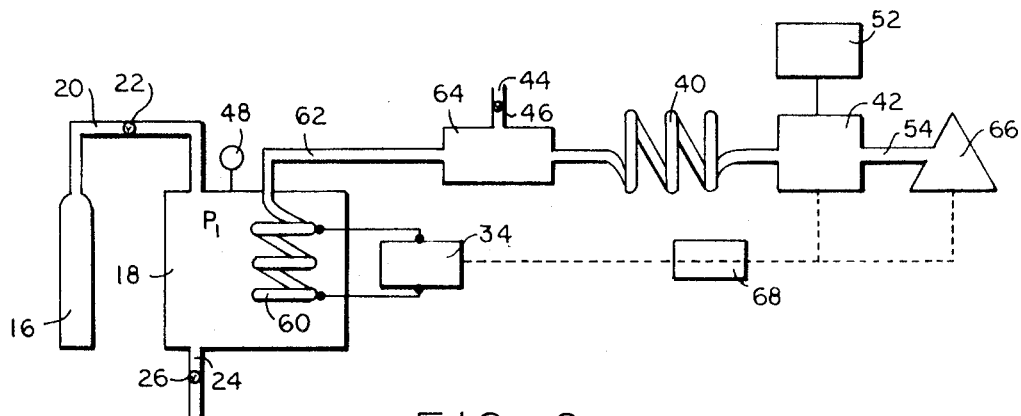
FIG. 2 is a schematic view of a constant flow rate program controlled system utilizing a feedback signal to the programmer/controller.

A further embodiment of the invention is illustrated in FIG. 2. In this embodiment the palladium film is replaced by a closed end tube or spiral 60 disposed within the container 18. The output 62 from the spiral 60 is applied to a sample mixing chamber 64, as is the sample inlet tube 44 containing valve 46. The tubular or spiral configuration of the palladium film has been found to be more efficient in that the tube is easier to heat than the film, and furthermore, the wall surface area is much greater and therefore, the total transfer or flux of hydrogen per unit time is greatly increased.

In this embodiment, the flow program simply consists of maintaining the flow rate through the column 40 at a constant level. This is accomplished by delivering the effluent from outlet tube 54 to a flow sensitive detector 66 such as a thermal conductivity detector. The output signal from the detector 66 would be fed back through a servo mechanism 68 to the variable power supply 34 to maintain the flow rate through the column at a constant rate. When a flow sensitive detector such as a thermal conductivity detector 42 is utilized, the signal from detector 42 may be utilized to control the power supply 34 and the detector 66 may be dispensed with. In other respects, the apparatus would be operated in the manner described above, with respect to FIG. 1.

Figure 3:
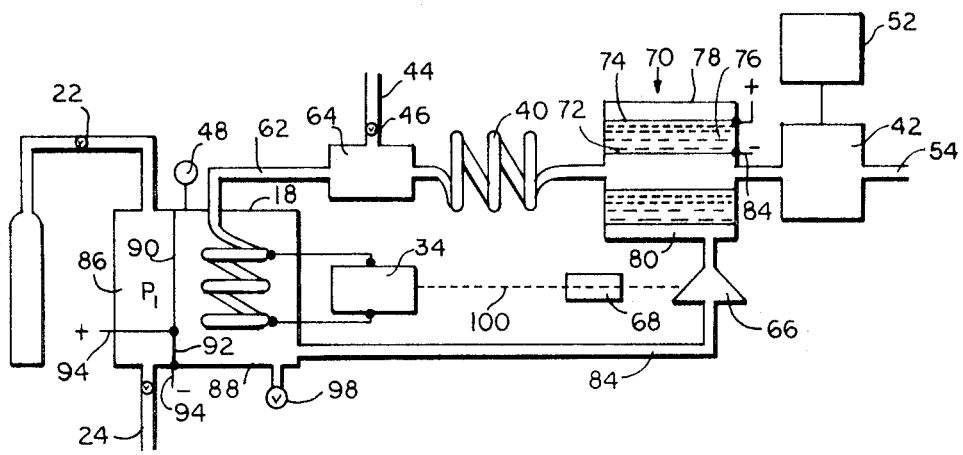
FIG. 3 is a schematic view of a further embodiment of the invention illustrating the use of a carrier gas separator/generator to recycle the carrier gas to the column.

The system illustrated in FIG. 3 further includes a combined separator-generator such as disclosed in co-pending application, Ser. No. 7,922 filed Feb. 2, 1970. The generator-separator 70 includes a central anode tube 72 disposed within an outer cathode tube 74 forming an annular space therebetween which is filled with a body 76 of an electrolyte capable of transporting an ionic species of the carrier gas between the electrodes 72, 74. In the case of hydrogen carrier gas, the electrodes are formed of palladium alloy, suitably a palladium-silver alloy and the electrolyte is a molten Group I metal hydroxide suitably a mixture of sodium or potassium hydroxide and 10–25% lithium hydroxide containing 10–35% water. The cathode is further surrounded with a container 78 to form an outer carrier gas collection chamber 80. The end walls 82 of the generator-separator device are formed of an insulating material to electrically isolate the anode and cathode. Electrical connections 84 are provided to the anode and cathode and to a power supply, not shown.

An energization of the power supply to the electrodes, the electrodes are raised to hydrogen permeable temperature of about 240° C. by the internal resistance of the cell and the electrolytic current applied to the electrodes applies a pumping force to increase a flow rate of hydrogen through the anode tube 72. The hydrogen traverses the anode tube and is converted to water and electrolytically transported to the interior surface of the cathode tube 74 within the electrolyte. The water is electrolytically dissociated at the inside surface of the cathode and the regenerated hydrogen is transferred through the cathode tube 74 into collection chamber 80. The hydrogen collected in chamber 80 is returned to the container 18 by recycle conduit 84. The flow sensitive detector 66 is interposed in the recycle conduit 84. The signal from detector 66 is applied to the servo mechanism 68 which controls the voltage output from power supply 34.

Container 18 in this embodiment is divided into a first chamber 86 and second chamber 88 by means of a wall 90. One portion of the wall 90 is formed of a palladium containing film 92 connected to electrical leads 94 and an electrical power supply, not shown. The vent tube 24 is connected to the first chamber 86. The recycle conduit 84 communicates with the second chamber 88. The chamber 88 further contains a pressure regulating valve 98.

To operate the device of this embodiment regulating valve 22 is opened and film 92 is heated to a hydrogen permeable temperature. When gauge 48 indicates that chamber 88 is at pressure $P_1$, the power supply 34 is turned on at a desired level. After a short interval sample inlet valve 46 is opened and the carrier gas leaving through outlet tube 62 enters sample chamber 64, mixes with the sample and the mixture flows through the column 40.

The effluent leaves the column 40 and enters the anode tube 72 of the generator/separator device 70. Device 70 acts as an enrichment-interface to the detector 42 and separates the carrier gas before detection. This has the effect of greatly increasing the sensitivity and detectivity of the measurement. The device 70 further regenerates the carrier gas into chamber 80. The hydrogen output from the chamber 80 in conduit 84 is sensed by means of flow sensitive sensor 66 and the electrical output signal from the sensor 66 is fed back to control the power supply 34 through servo loop 100.

The recycled gas and make up gas through the film 92 are balanced and maintained at pressure $P_1$ by means of the regulating valve 98. The impurities collect in chamber 86 and this chamber may be vented through vent tube 24 without disturbing the system. The requirement for carrier gas is substantially diminished by use of the closed loop carrier gas recycled from the generator/separator while the sensitivity of the system is greatly increased. Both effects are obtained with minimal increase in the complexity of the apparatus. The apparatus of all the embodiments is quite simple and reliable and in every case avoids and obviates the elaborate and complex valving and control devices previously required.

It is to be understood that only preferred embodiments of the invention have been described and that numerous substitutions, modifications and alterations are all permissible without departing from the spirit and scope of the invention as defined in the following claims.

What is claimed is:

1. A gas chromatograph system comprising in combination:
    a source of carrier gas;
    a gas chromatograph column having an inlet and an outlet;
    sampling means for introducing a sample to said inlet;
    a detector for receiving the effluent from said outlet, and for developing a signal indicative of a component of said sample;
    a film of material impermeable to gas under ambient conditions and capable of being rendered selectively permeable to said carrier gas when heated interposed between said source and said inlet; and
    means for heating said film to a carrier gas permeable temperature.

2. A system according to claim 1 further including controller means associated with said heating means for selectively controlling the temperature of said film.

3. A system according to claim 1 in which said carrier gas comprises hydrogen and said film comprises palladium.

4. A system according to claim 3 in which said source includes a pressurized supply of carrier gas, regulating valve means connected to said supply and container means for receiving said regulated supply; and said film comprises a tubular element having a closed end disposed within said container and an open end extending therefrom and connected to the inlet to said column.

5. A system according to claim 1 in which said heating means comprises an electrical power source and conductor means connecting the film to the source.

6. A system according to claim 5 in which said source is a variable electrical power source and further including controller means connected to said source for determining the electrical output therefrom.

7. A system according to claim 6 in which said controller means includes a programming element for controlling the output of said source according to the predetermined program of said element.

8. A system according to claim 6 in which the controller means includes a flow sensitive sensor for sensing the output from said column and developing a signal indicative of the flow rate of the output and feed back means for applying the signal to control said source.

9. A system according to claim 1 further including carrier gas separator means disposed between said outlet and said detector for removing at least some of said carrier gas from the column effluent preliminary to detection.

10. A system according to claim 9 in which said separation means comprises a palladium containing film having a first surface in contact with said effluent and a second surface in contact with an oxidizing medium.

11. A system according to claim 10 further including carrier gas regeneration means comprising an additional regeneration palladium containing film adjacent said separation film forming a chamber between a first surface of the regeneration film and the second surface of said separation film, a body of molten electrolyte capable of transporting an ionic species of the carrier gas between said films received in said chamber and means for applying an electric potential between said films.

12. A system according to claim 11 further including a carrier gas collection chamber adjacent the second surface of said regeneration film and means for recycling the collected carrier gas from said chamber to said source.

13. A flow programmer for a gas analysis system comprising:
    a source of carrier gas;
    gas analysis means;
    a film having selective but variable permeability to said carrier gas interposed between said source and said analysis means; and
    controller means associated with said film for controlling the permeability of said film to carrier gas.

14. A flow programmer according to claim 13 further including pressure regulating means associated with said source for maintaining a constant pressure of carrier gas on the upstream side of said film.

15. A programmer according to claim 13 in which the carrier gas is hydrogen and the film which comprises palladium is impermeable to gas when below 150° C. and is increasingly selectively permeable to hydrogen at temperatures above 150° C. and said controller means includes means for heating said film and programmer means for controlling said heating means.

References Cited

UNITED STATES PATENTS

| | | | |
|---|---|---|---|
| 3,455,817 | 7/1969 | Modell | 55—16 X |
| 3,494,174 | 2/1970 | Green et al. | 55—158 X |

J. L. DeCESARE, Primary Examiner

U.S. Cl. X.R.

55—158